(12) United States Patent
Dubovsky

(10) Patent No.: US 8,164,299 B2
(45) Date of Patent: Apr. 24, 2012

(54) MAXIMUM POWER POINT TRACKING CHARGE CONTROLLER WITH COUPLED INDUCTOR MULTI-PHASE CONVERTER

(75) Inventor: Stephen Dubovsky, Sliver Spring, MD (US)

(73) Assignee: Morningstar Corporation VA (US)

( * ) Notice: Subject to any disclaimer, the term of this patent is extended or adjusted under 35 U.S.C. 154(b) by 461 days.

(21) Appl. No.: 12/425,949

(22) Filed: Apr. 17, 2009

(65) Prior Publication Data
US 2010/0264869 A1    Oct. 21, 2010

(51) Int. Cl.
*H01M 10/44* (2006.01)
(52) U.S. Cl. .................... 320/102; 320/125
(58) Field of Classification Search .............. 320/102, 320/124, 125, 126, 127, 140
See application file for complete search history.

(56) References Cited

U.S. PATENT DOCUMENTS

| | | | | |
|---|---|---|---|---|
| 5,266,789 | A * | 11/1993 | Anglin et al. | 235/483 |
| 7,072,194 | B2 * | 7/2006 | Nayar et al. | 363/71 |
| 2007/0236187 | A1 * | 10/2007 | Wai et al. | 323/222 |
| 2008/0315786 | A1 * | 12/2008 | Weichmann et al. | 315/291 |
| 2009/0066307 | A1 * | 3/2009 | Osterhout et al. | 323/283 |
| 2009/0183763 | A1 * | 7/2009 | Meyer | 136/246 |
| 2009/0327786 | A1 * | 12/2009 | Carroll et al. | 713/340 |

FOREIGN PATENT DOCUMENTS
WO WO 03/084041 A1 10/2003

OTHER PUBLICATIONS

Czogalla et al. ("Automotive Application of Multi-Phase Coupled-Inductor DC-DC Converter", Thayer School of Engineering, Darthmouth College, 2003).*
Taylor et al. ("Phase Shifting Optimizes Multistage Buck Converters", Texas Instruments Manual Jan. 2007).*
Wikipedia ("Buck Converter", Jan. 23, 2009).*
Jens Czogalla et al; "Automotive Application of Multi-Phase Coupled-Inductor DC-DC Converter"; IAS 2003; Thayer School of Engineering, Dartmouth College, Hanover, NH, 6 pgs.
J.M.Enrique et al; "Theoretical assessment of the maximum power point tracking efficiency of photovoltaic facilities with different converter topologies";Jun. 15, 2006;.
University of Huelva, Spain; 8 pages.

* cited by examiner

*Primary Examiner* — Huy Q Phan
*Assistant Examiner* — Temilades S Rhodes-Vivour

(57) ABSTRACT

A maximum power point tracking charge controller for photovoltaic systems tracks the maximum power point voltage of a PV array, and employs a coupled inductor multi-phase buck converter for converting the maximum power voltage to the voltage required to charge one or more batteries. The phase configurations are phase shifted from one another. One of the phase configurations is intentionally temporarily shut down when the output power is low. A first switch or a second switch of the phase configuration that is shut down is turned on to conduct electrical current when predetermined conditions are satisfied. A method of controlling battery charging in a photovoltaic system involves operating a coupled inductor multi-phase buck converter so that one of the phase configurations is intentionally temporarily shut down when the power output is below a predetermined value.

20 Claims, 9 Drawing Sheets

MAXIMUM POWER POINT TRACKING CHARGE CONTROLLER WITH COUPLED INDUCTOR MULTI-PHASE CONVERTER

BACKGROUND OF THE INVENTION

1. Field of the Invention

The present invention pertains generally to photovoltaic system charge controllers and, more particularly, to photovoltaic system charge controllers that employ maximum power point tracking.

2. Brief Discussion of the Related Art

Photovoltaic (PV) systems that produce electricity from solar energy have established themselves as a successful and reliable option for electrical power generation. Photovoltaic systems have continually been gaining in popularity as the cost of such systems has been reduced, as the cost of utility-supplied power has escalated, and as greater attention has been paid to the need for renewable, alternative energy sources. Basically, a photovoltaic system includes a photovoltaic (PV) array made up of one or more PV panels or modules composed of photovoltaic cells capable of converting solar energy into electrical energy, a battery bank made up of one or more batteries for storing the electrical energy produced by the photovoltaic array, and a charge controller for controlling the charging of the one or more batteries with the electrical energy produced by the photovoltaic array. The electrical energy stored in the battery bank is available to power a load, and inverters are sometimes used to convert the battery direct current (DC) into alternating current (AC) suitable for AC loads. Photovoltaic systems are frequently employed to power loads independently of utility power, such as where electrical power from a utility grid is unavailable or not feasible, and these photovoltaic systems are commonly referred to as "off-grid" and "stand-alone" photovoltaic systems.

Photovoltaic systems have been designed with traditional charge controllers that do not employ maximum power point tracking (MPPT), and such controllers may be referred to as non-MPPT charge controllers. Non-MPPT charge controllers connect the PV array directly to the battery bank for charging. Usually there is a mismatch between the output voltage of the PV array and the voltage required to charge the battery bank that results in under-utilization of the maximum power output from the PV array. The reason for the mismatch is that most PV modules are rated to produce a nominal 12V under standard test conditions but, because they are designed for worse than standard test conditions, in actual fact they produce significantly more power. On the other hand, a nominal 12V battery requires close to an actual 12V depending on battery state of charge. When a non-MPPT charge controller is charging the battery bank, the PV module is frequently forced to operate at a battery voltage that is less than the optimal operating voltage at which the PV module is capable of producing its maximum power. Hence, non-MPPT charge controllers artificially limit power production to a sub-optimal level by constraining the PV array from operating at maximum output power.

A maximum power point tracking (MPPT) charge controller addresses the aforesaid disadvantage of non-MPPT charge controllers by managing the voltage mismatch between the PV array and the battery bank through the use of power electronics. The primary functions performed by MPPT charge controllers involve measuring the PV module output to find the maximum power voltage ($V_{mp}$), i.e. the voltage at which the PV module is able to produce maximum power, and operating the PV module at the maximum power voltage to extract or harvest full power (watts) from the PV array, regardless of the present battery voltage ($V_B$).

Photovoltaic modules are made up of photovoltaic (PV) cells that have a single operating point where the values of the current (I) and voltage (V) of the cell result in a maximum power output. The maximum power voltage varies with operating conditions including weather, sunlight intensity, and PV cell temperature. As the maximum power voltage ($V_{mp}$) of the PV module varies, the MPPT charge controller "tracks" the $V_{mp}$ and adjusts the ratio between the maximum power voltage and the current delivered to the battery in order to match what the battery requires. The MPPT charge controller utilizes a control circuit or logic to search for the maximum power output operating point and employs power electronics to extract the maximum power available from a PV module.

A MPPT charge controller employs power electronics that have a higher input voltage than output voltage, hence $V_{mp} > V_B$. Typically, $V_{mp}$ is greater than 15V for a 12V nominal battery. The power electronics are conventionally designed to include a high frequency DC to DC converter that receives the maximum power voltage from the PV array as converter input and converts the maximum power voltage to battery voltage as converter output. An increase in battery charge current is realized by harvesting PV module power that would be left unharvested using a non-MPPT charge controller. As the maximum power voltage varies, the actual charge current increase that is realized will likewise vary. Generally speaking, the greater the mismatch or disparity between the PV array maximum power voltage and the battery voltage, the greater the charge current increase will be. The charge current increase will ordinarily be greater in cooler temperatures because the available power output and the maximum power voltage of the PV module increases as the photovoltaic cell temperature decreases. In addition, lower battery voltage, as in the case of a highly discharged battery, will result in a greater charge current increase.

Most MPPT charge controllers utilize power electronics designed to include a "buck" converter having topology to "buck" a higher input voltage to a lower output voltage. Buck converters are familiar in the field of power electronics and essentially include an inductor and two complementary switches to achieve unidirectional power flow from input to output. A first of the switches is ordinarily a controlled switch such as a MOSFET or transistor, and the second of the switches is ordinarily an uncontrolled switch such as a diode. The buck converter alternates between connecting the inductor to the input voltage ($V_A$) from the PV array to store energy in the inductor and discharging the inductor into the battery bank. When the first switch is turned on for a time duration, the second switch becomes reverse biased and the inductor is connected to the input voltage ($V_A$). There is a positive voltage ($V_L$) across the inductor equal to the input voltage ($V_A$) minus the output voltage ($V_B$), hence $V_L = V_A - V_B$ and there is an increase in the inductor current ($I_L$). In this "on" state, energy is stored in the inductor. When the first switch is turned off, inductor current $I_L$ continues to flow due to the inductor energy storage, resulting in a negative voltage across the inductor ($V_L = -V_B$). The inductor current now flows through the second switch, which is forward biased, and current $I_L$ through the inductor decreases. In this "off" state, energy continues to be delivered to the output until the first switch is again turned on to begin another on-off cycle. The buck converter is operated in continuous conduction mode (CCM) when the current through the inductor never falls to zero during the commutation cycle. If the buck converter is operated in continuous conduction mode, the output voltage ($V_B$) is equal to $V_A \times d$, where d is the duty cycle (d=[0,1]) of the switches. The buck converter is operated in discontinuous conduction mode (DCM) when the current through the inductor goes to zero every commutation cycle.

Traditional buck converters give rise to input and output ripples, and one approach that has been taken to reduce these ripples involves adding capacitors to the buck converter circuitry for filtering. The input current to the buck converter is discontinuous, being a series of pulses, and it has a very high ripple. In order to limit the resulting voltage ripple around the maximum power voltage, large input capacitors are typically required which must also be rated to handle the ripple current. Although the output current from the buck converter is continuous, output capacitors are still normally employed for filtering to reduce the ripple seen by the battery. The use of capacitors to filter input and output ripples has various disadvantages including added cost and slowing down the system control bandwidth that manages transients.

MPPT charge controllers have been designed with the buck converter implemented as a multi-phase buck converter in which the phases are staggered or interleaved, resulting in reduced input and output ripples. Consequently, capacitor size and cost are reduced, and higher frequency system control bandwidth is made possible. In a two-phase arrangement, the buck converter may be implemented as two smaller buck converter phase configurations in parallel, with each of the buck converter phase configurations having its own inductor and switches. One buck converter phase configuration is run 180° out of phase from the other buck converter phase configuration so that the current pulses assist in cancelling each other with the result that ripple is reduced. In general, the worst case ripple for a single phase buck converter is 50% the output current and for a two-phase buck converter it is 25% the output current. Accordingly, a 2:1 reduction in worst case ripple can be obtained with a two-phase buck converter in comparison with a one-phase or single-phase buck converter. Although the multi-phase arrangement can reduce input and output ripple by a factor of 2, it does not affect the ripple on the internal phase components of the buck converter phase configurations. Accordingly, the ripple is not reduced on the individual components, i.e. the switches and inductor, within each buck converter phase configuration. In the area of MPPT charge controllers for PV systems, it has not previously been recognized to couple the inductors of the buck converter phase configurations in a multi-phase buck converter to reduce ripple currents in the inductors and switches themselves. In the area of MPPT charge controllers for PV systems, various obstacles have stood in the way of a coupled inductor multi-phase buck converter including the increased EMI associated with a coupled inductor, the added difficulty involved in controlling the buck converter as the phases interact, and the loss of stability in simple controller loops.

SUMMARY OF THE INVENTION

The present invention is generally characterized in a maximum power point tracking (MPPT) charge controller for photovoltaic (PV) systems in which the charge controller controls charging of a battery bank with electricity produced by a PV array. The charge controller employs a maximum power point tracking algorithm for tracking the maximum power point of the PV array at which the PV array produces maximum power voltage. The charge controller includes a coupled inductor multi-phase buck converter for receiving the maximum power voltage from the PV array as input to the charge controller and for converting the maximum power voltage to the appropriate output voltage to charge one or more batteries of the battery bank. The buck converter converts the voltage input to a voltage output that matches the voltage required by the battery bank for charging. The buck converter stores electrical energy when the voltage input is greater than the voltage required by the battery bank for charging. The buck converter comprises multiple buck converter phase configurations phase shifted from one another. Each buck converter phase configuration has a phase inductor and first and second switches, and the phase inductors are combined on a single core to form a coupled inductor. One of the buck converter phase configurations is intentionally temporarily shut down at low output power. A first switch or a second switch of the buck converter phase configuration that has been intentionally temporarily shut down is turned on and conducts electricity when predetermined conditions are met. In particular, a first or bottom diode of the buck converter phase configuration that has been intentionally temporarily shut down is turned on to conduct electrical current when (voltage input/voltage output)>2+(equivalent leakage inductance/equivalent magnetizing inductance). A second or top diode of the buck converter phase configuration that has been intentionally temporarily shut down is turned on to conduct electrical current when 1<(voltage input/voltage output)<1+(equivalent magnetizing inductance/(equivalent leakage inductance+equivalent magnetizing inductance)).

A further aspect of the invention is generally characterized in a method of controlling battery charging in a PV system having a charge controller electrically connected to a PV array and to a battery bank, where the method comprises the steps of operating a maximum power point tracking algorithm of the charge controller to track the maximum power point of the PV array at which the PV array produces maximum power voltage; supplying the maximum power voltage as voltage input to a buck converter of the charge controller that includes multiple buck converter phase configurations having phase inductors combined on a single core to form a coupled inductor; operating the buck converter to convert the voltage input into voltage output that matches the voltage required by the battery bank for charging; and supplying the voltage output from the charge controller to the battery bank to charge one or more batteries of the battery bank. The step of operating the buck converter involves running the multiple buck converter phase configurations out of phase from one another and intentionally temporarily shutting down one of the buck converter phase configurations when the power output is low.

Other objects and advantages of the present invention will become apparent from the following description of the preferred embodiments taken in conjunction with the accompanying drawings.

BRIEF DESCRIPTION OF THE DRAWINGS

FIG. 19 is a graph depicting the conditions when the first and second switches of the intentionally temporarily disabled buck converter phase configuration are turned on.

DETAILED DESCRIPTION OF THE INVENTION

Figure 1:
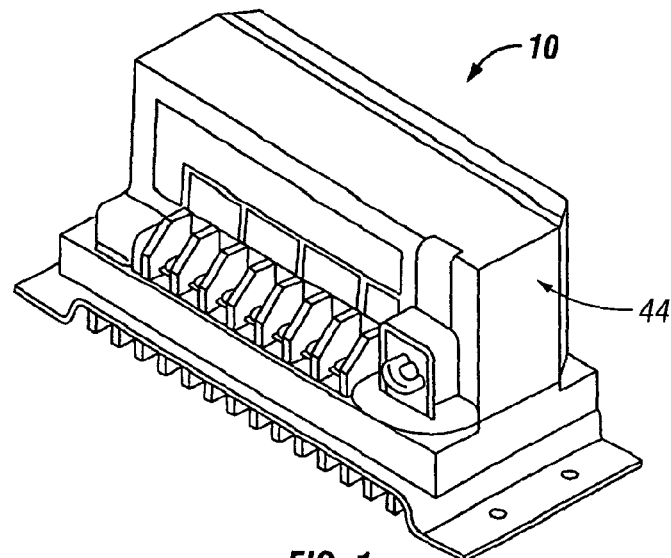
FIG. 1 is a perspective view of a maximum power point tracking (MPPT) charge controller with coupled inductor multi-phase converter.
Figure 2:
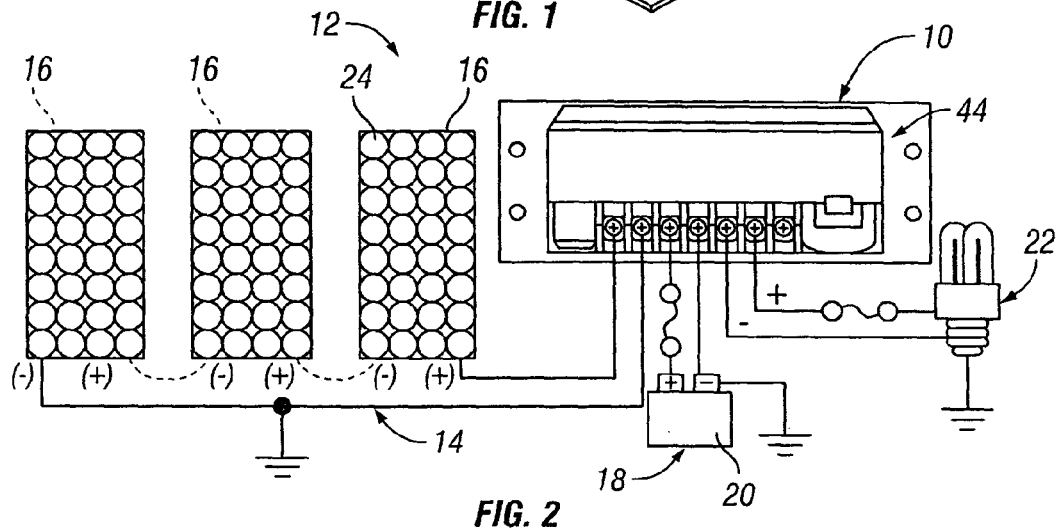
FIG. 2 is a top view of the MPPT charge controller of FIG. 1 integrated in a photovoltaic (PV) system, with the MPPT charge controller being electrically connected to a photovoltaic (PV) array, a battery bank and a load.

A maximum power point tracking (MPPT) charge controller 10 having a coupled inductor multi-phase converter is illustrated in FIGS. 1 and 2, the MPPT charge controller 10 being shown in FIG. 2 incorporated in a photovoltaic (PV) system 12. The PV system 12 comprises a photovoltaic (PV) array 14 including one or more photovoltaic (PV) modules or panels 16, a battery bank 18 including one or more batteries 20, and the MPPT charge controller 10 electrically connected to the array 14 and to the battery bank 18. The MPPT charge controller 10 is shown in FIG. 2 with a load output connection of the controller electrically connected to a load 22 that is to be powered by the PV system 12. The load output connection on the MPPT charge controller 10 functions to deliver battery voltage to the load 22. Typical loads 22 include lights, pumps, motors, DC appliances, and electronic devices. The load output connection of the MPPT charge controller 10 can be electrically connected to a load distribution panel, in which case the load distribution panel may be considered the load 22. The PV system 12 may incorporate an inverter (not shown) electrically connected to the battery bank 18 for converting the DC electricity of the one or more batteries 20 into AC electricity to power an AC load. Although the following description of the invention refers to a PV system in which the PV array 14 is made up of a single PV module or panel 16 and the battery bank 18 is made up of a single battery 20, it should be appreciated that the invention is intended to encompass PV systems in which the PV array 14 is made up of a plurality of PV modules or panels 16 and/or those in which the battery bank 18 is made up of a plurality of batteries 20.

Figure 3:
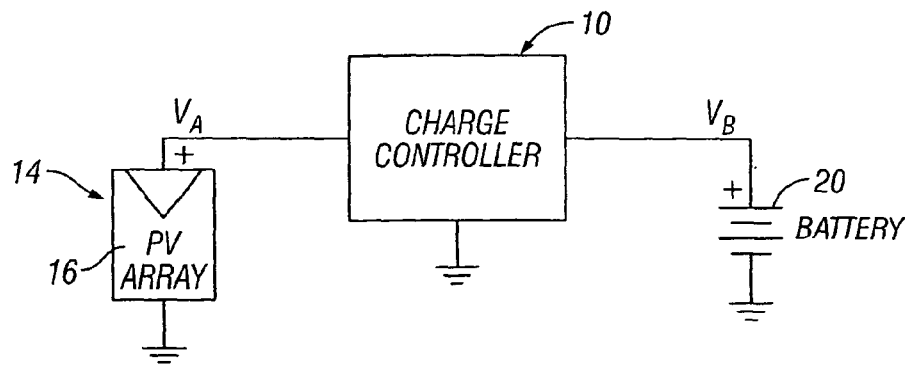
FIG. 3 is an electrical diagram illustrating use of the MPPT charge controller to charge the battery bank with electricity produced by the PV array.

The PV module 16 is composed of photovoltaic (PV) cells 24 capable of converting solar energy into electrical energy. The battery 20 is capable of storing the electrical energy produced by the PV module 16. As seen in FIG. 3, the MPPT charge controller 10 controls charging of the battery 20 with the electrical energy produced by the PV module 16. The MPPT charge controller 10 receives input voltage $V_A$ from the PV array 14. Output voltage $V_B$ from the MPPT charge controller 10 is supplied to the battery 20. The electrical energy produced by the PV array 14 and stored in the battery 20 is available to power the load 22. In addition, the battery 20 can be used to power the MPPT charge controller 10, and typically the battery requires greater than 7 Volts to supply sufficient power to the MPPT charge controller 10. Alternatively, the MPPT charge controller 10 can be powered off of the PV array 14.

In one preferential but not limiting embodiment, the MPPT charge controller 10 is designed for use in a PV system 12 in which the PV array 14 is a 12 Volt, 24 Volt or 36 Volt nominal off-grid PV module array, the system voltage is 12 Volts/24 Volts and the battery bank is 12 Volts/24 Volts, the rated battery current is 15 Amps, the rated load current is 15 Amps, the maximum input voltage to the MPPT charge controller is 75 Volts, and the nominal input power is 200 Watts for a 12 Volt battery system and 400 Watts for a 24 Volt battery system. The nominal voltage of the PV array 14 must be equal to or greater than the nominal voltage of the battery bank 18. Therefore, for a 24 Volt system, the PV array 14 must be a 24 Volt or 36 Volt nominal PV array. The MPPT charge controller 10 can be used in a PV system 12 in which the PV array 14 is made up of one or more grid-tie modules, provided the PV array open circuit voltage ($V_{OC}$) rating does not exceed the 75 Volt maximum input voltage rating at worst case (coldest) PV module temperature.

Figure 4A:
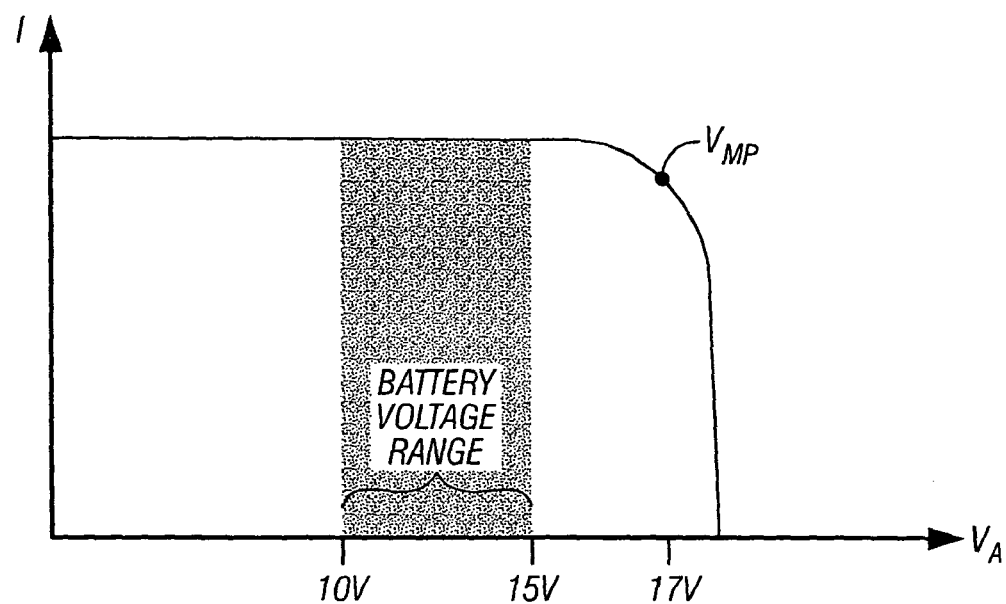
FIG. 4A is a typical current (I) vs. voltage (V) output curve for a nominal 12V off-grid photovoltaic (PV) module of the PV array.
Figure 4B:
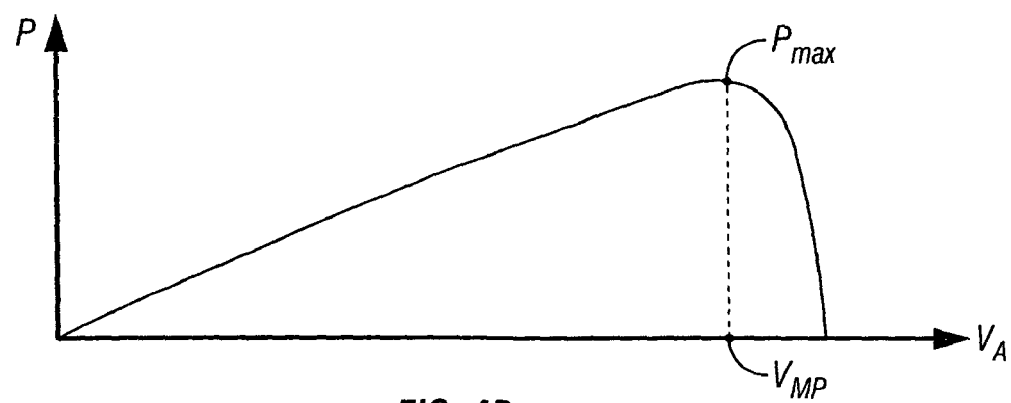
FIG. 4B is a typical power output curve for the PV module of FIG. 4A.

FIG. 4 depicts a typical current (I) vs. voltage (V) output curve for a nominal 12V off-grid PV module 16. The maximum power voltage $V_{mp}$ is the voltage where the product of current and voltage (amps×volts) is greatest, and it falls on the "knee" of the PV module I-V curve as shown in FIG. 4. In a 12V system, the battery voltage may range from 10-15V DC but the maximum power voltage $V_{mp}$ of the PV module 16 is typically around 17 V as again seen in FIG. 4. The maximum power voltage $V_{mp}$ vanes with operating conditions including weather, sunlight intensity, and photovoltaic cell temperature. As previously explained hereinabove, traditional non-MPPT charge controllers for photovoltaic systems connect the PV module 16 directly to the battery 20 for charging. Charge controllers of this type frequently require that the PV module 16 operate in a voltage range that is below the maximum power voltage $V_{mp}$ of the module 16. Consequently, electrical energy is wasted that could otherwise be used to charge the battery 20 and power the system load 22.

The MPPT charge controller 10 employs maximum power point tracking (MPPT) to manage the disparity between the output voltage of the PV array 14 and the voltage required to charge the battery 20. The MPPT charge controller 10 operates a maximum power point tracking algorithm to identify and track the $V_{mp}$ of the PV module 16, even as the $V_{mp}$ changes with operating conditions, and utilizes power electronics that have a higher input voltage $V_A$ than output voltage $V_B$ to adjust the ratio between the $V_{mp}$ and the current delivered to the battery 20 in order to match what the battery requires. The maximum power point tracking algorithm, which is fully automatic and does not require user adjustment, tracks the $V_{mp}$ as it varies and ensures that maximum power is harvested from the PV array 14 throughout the course of each day. The present invention is primarily concerned with the power electronics used in the MPPT charge controller 10 to receive the $V_{mp}$ from the PV array 14 as input and to convert the $V_{mp}$ to battery voltage $V_B$ as output as explained further below.

Figure 5:
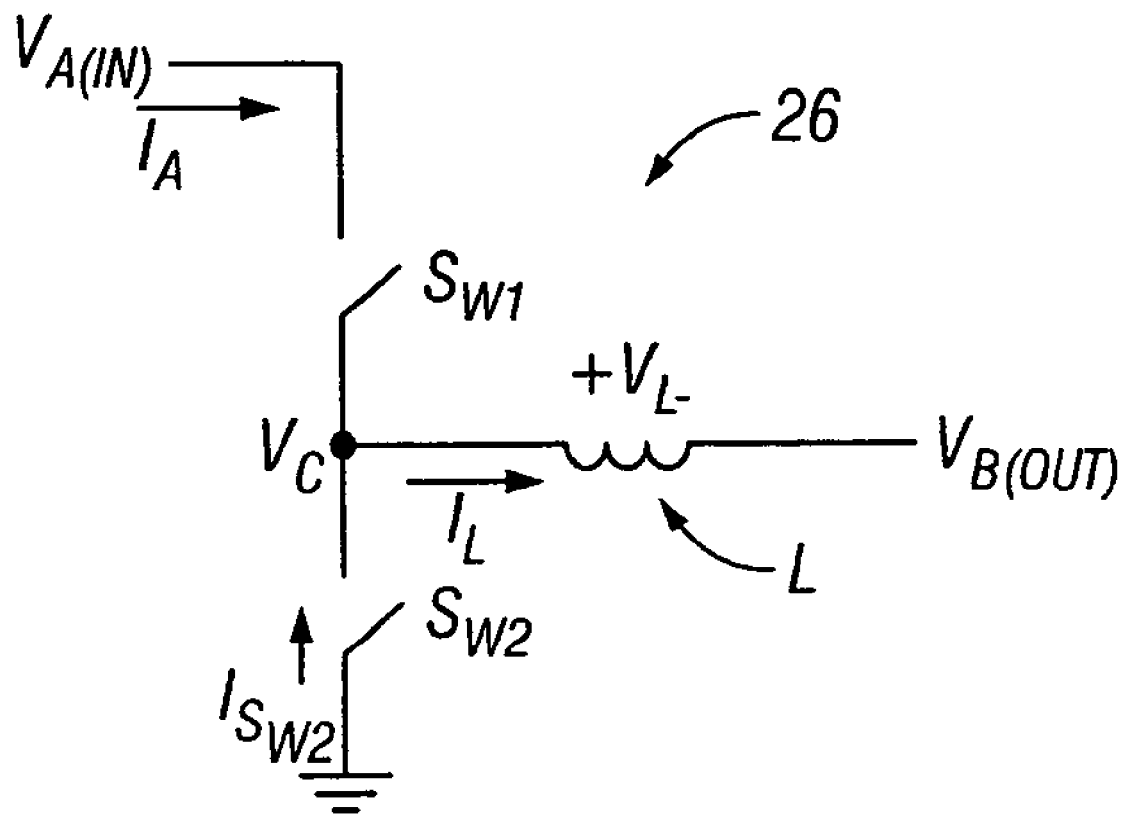
FIG. 5 is an electrical diagram of a single-phase buck converter as conventionally employed in prior MPPT charge controllers for PV systems.

In order to lay the groundwork for understanding the approach taken in the MPPT charge controller 10 for converting the $V_{mp}$ to battery voltage $V_B$, it is helpful to consider the approaches conventionally employed in prior MPPT charge controllers for PV systems. Prior MPPT charge controllers for PV systems have conventionally been designed with a single-phase or one-phase DC to DC buck converter 26 to "buck" a higher input voltage to a lower output voltage as represented in the electrical diagram of FIG. 5. The buck converter 26 essentially includes an inductor L and two complementary switches SW1 and SW2 to achieve unidirectional electrical power flow from the buck converter input to the buck converter output. The input voltage $V_A$ to the buck converter 26 is received from the PV array and is oftentimes greater than the output voltage $V_B$ from the buck converter 26 that is needed to charge the battery, hence $V_A > V_B$. Switch SW1 is a controlled switch such as a MOSFET or transistor, and switch SW2 is usually an uncontrolled switch such as a diode. During a switching cycle, the switch SW1 is turned "on" for a time duration and is then turned "off" for a time duration. The buck converter 26 alternates between connecting the inductor L to the input voltage $V_A$ (in) from the PV array to store energy in the inductor L and connecting the inductor L to ground to discharge the stored energy to the output voltage $V_B$ (out) from the buck converter 26 into the battery.

Figure 6:
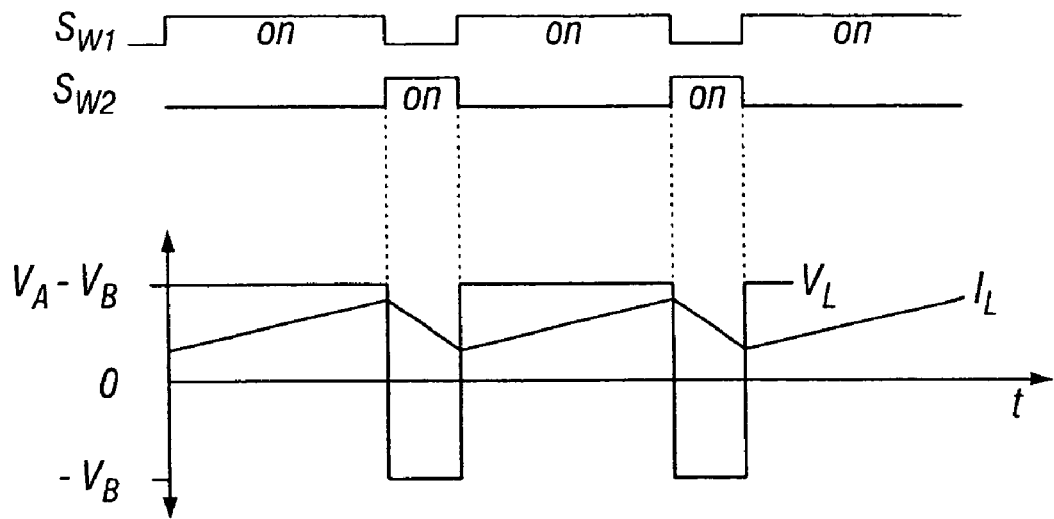
FIG. 6 is a graph illustrating voltage and current through an inductor of the single-phase buck converter of FIG. 5 during on-off cycling of first and second switches of the buck converter when in continuous conduction mode.

As best understood with reference to the graph of FIG. 6, when the switch SW1 is turned on, the inductor L is connected to the input voltage $V_A$ and the switch SW2 becomes reverse biased or turned off, resulting in a positive voltage $V_L$ across the inductor equal to $V_A - V_B$ and an increase in the inductor current $I_L$. Furthermore, when the switch SW1 is on, the input current $I_A$ is equal to the inductor current $I_L$ ($I_A = I_L$), and the current $I_{SW2}$ across switch SW2 is equal to zero. In this "on" state, energy is stored in the inductor L. When the switch SW1 is turned off, inductor current $I_L$ continues to flow due to the inductor energy storage, resulting in a negative voltage $V_L$ across the inductor equal to $-V_B$. The inductor current now flows through the switch SW2, which is forward biased or turned on, and current $I_L$ through the inductor decreases. The input current $I_A$ is now equal to zero and the current $I_{sw2}$ across switch SW2 is equal to the inductor current $I_L$. In this "off" state, electrical energy continues to be delivered as output until the switch SW1 is again turned on to begin another on-off switching cycle. When the buck converter 26 is operated in continuous conduction mode (CCM), i.e. wherein the current $I_L$ through the inductor L never falls to zero during the commutation cycle, the output voltage $V_B$ is equal to the input voltage $V_A \times d$ where d is the duty cycle (d=[0,1]) of the switches SW1 and SW2. The input current $I_A$, which alternates from $I_L$ to zero as the switch SW1 is turned on and off, is a discontinuous series of pulses. The input and output ripple associated with the single-phase buck converter 26 is disadvantageous and has been addressed in other prior MPPT charge controllers for PV systems by designing the buck converter as a multi-phase buck converter as represented in the electrical diagram of FIG. 7.

Figure 7:
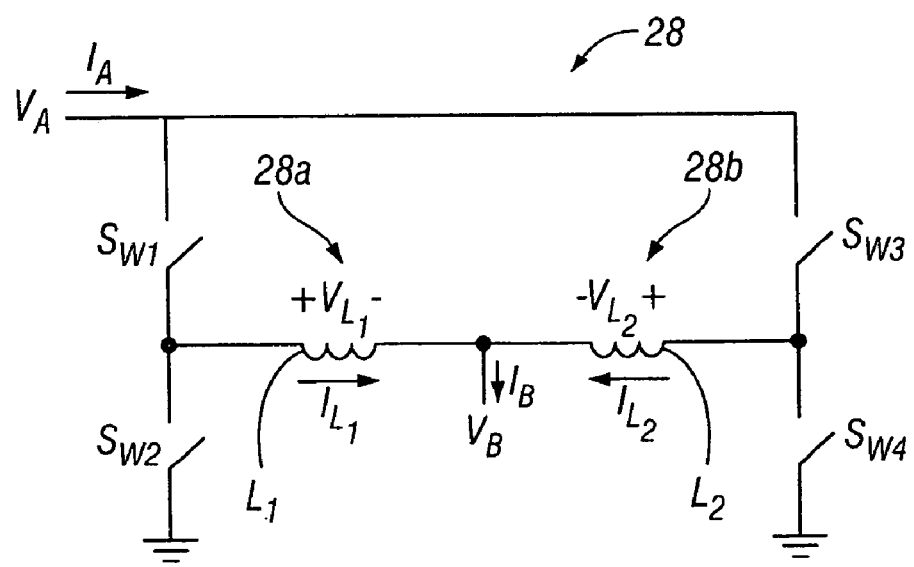
FIG. 7 is an electrical diagram of a two-phase buck converter as conventionally employed in prior MPPT charge controllers for PV systems.

FIG. 7 is representative of a two-phase buck converter 28 designed as two smaller buck converter phase configurations 28a and 28b in parallel. In a 15 Amp buck converter 28 for example, each buck converter phase configuration 28a and 28b would be designed for 7.5 Amps. The buck converter phase configurations 28a and 28b are run 180° out of phase of each other but otherwise operate independently. Each buck converter phase configuration 28a and 28b includes a phase inductor and two phase switches, i.e. phase inductor $L_1$ and phase switches SW1 and SW2 for buck converter phase configuration 28a and phase inductor $L_2$ and phase switches SW3 and SW4 for buck converter phase configuration 28b. Switches SW1 and SW2 are similar to those described for buck converter 26. Switch SW3 is like switch SW1, and switch SW4 is like switch SW2. The output current $I_D$ from the buck converter 28 is the sum of the currents $I_{L1}$ and $I_{L2}$ through the phase inductors $L_1$ and $L_2$, hence $I_B = I_{L1} + I_{L2}$.

A two-phase buck converter essentially has four states of operation. In the first state, the input voltage is connected to the buck converter phase configuration 28a and energy is both being transferred to the converter output and stored in the inductor $L_1$. At the same time, the input side of buck converter phase configuration 28b is connected to ground and the inductor $L_2$ transfers energy to the converter output. During the second state, the input sides of both phase configurations 28a and 28b are connected to ground and both inductors $L_1$ and $L_2$ transfer energy to the converter output. This cycle is repeated over the third and fourth states. Accordingly, the phase configuration 28b is connected to the input voltage while phase configuration 28a is connected to ground in the third state, and both phase configurations 28a and 28b are connected to ground in the fourth state. In the first state, which covers the time when phase configuration 28a is on, the current in phase configuration 28a is increasing as inductor $L_1$ is storing energy, and the current in phase configuration 28b is decreasing because inductor $L_2$ is transferring energy to the converter output. In the second state, which covers the time when phase configuration 28a is off, the current through both inductors $L_1$ and $L_2$ is decreasing as both are transferring energy to the converter output. In the third state, which covers the time when phase configuration 28b is on, current in phase configuration 28b is increasing as inductor $L_2$ is storing energy, and the current in phase configuration 28a is decreasing as inductor $L_1$ is transferring energy to the converter output. In the fourth state, which covers the time when phase configuration 28b is off, current through both inductors $L_1$ and $L_2$ is decreasing as both are again transferring energy to the converter output. Depending on the ratio of $V_A$ to $V_B$, less than all of the states of operation may be used in one cycle. For example, FIG. 8 depicts a situation where there is no fourth state.

Figure 8:
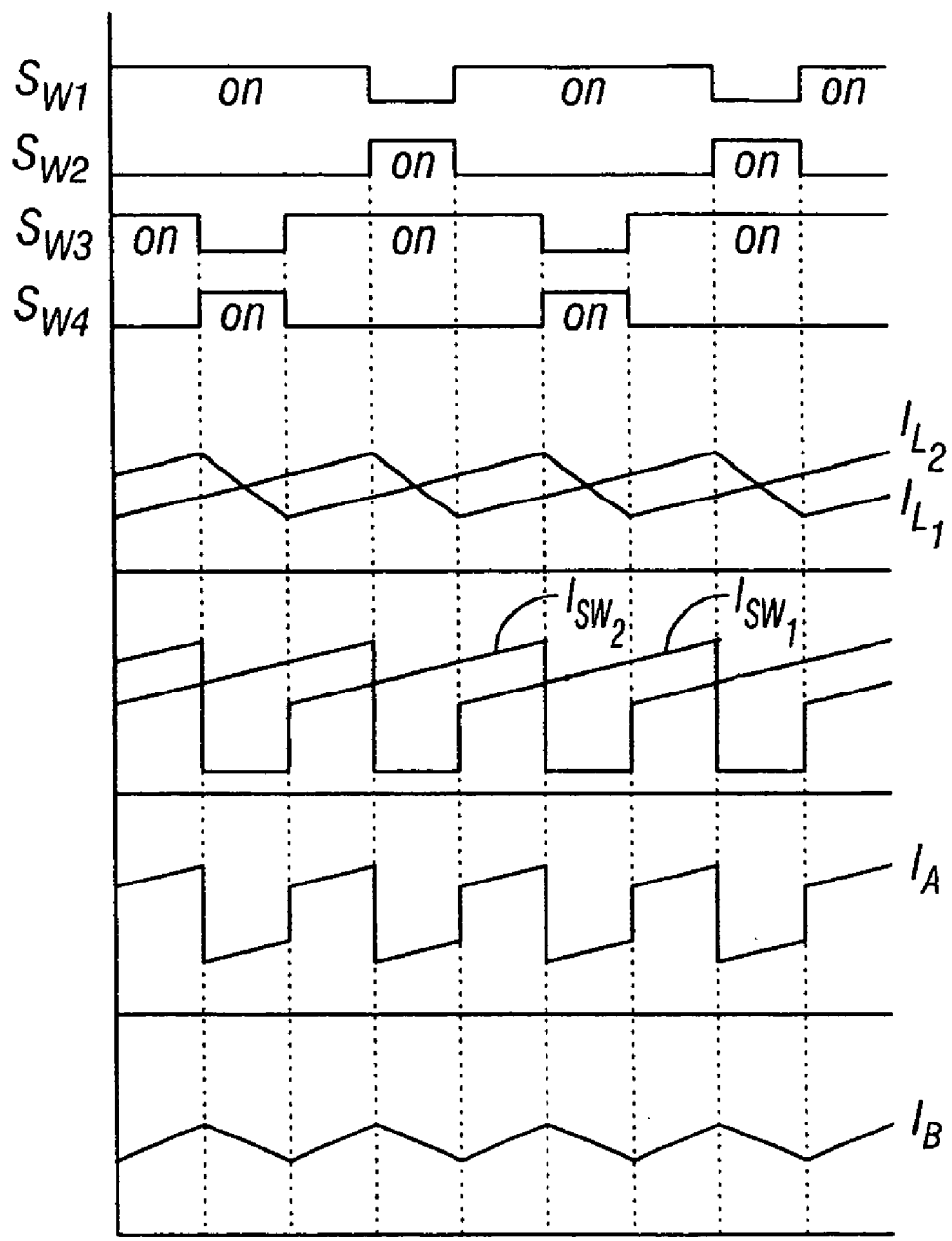
FIG. 8 is a graph depicting input current, output current, and current through phase inductors and switches of buck converter phase configurations of the two-phase buck converter of FIG. 7 during on-off cycling of the switches of the phase configurations.

Currents through the two-phase buck converter 28 during on-off switching cycles of the switches SW1 and SW3 are graphically depicted in FIG. 8. Switch SW1 is cycled on and off, and switch SW2 operates complementary to switch SW1 as described above for switches SW1 and SW2 of buck converter 26. Switch SW3 is cycled on and off, and switch SW4 operates complementary to switch SW3 in the same manner as switches SW1 and SW2, except that the on-off switching cycle for switch SW3 is 180° out of phase from the on-off switching cycle for switch SW1. Current through the inductors $L_1$ and $L_2$ during the switching cycles is represented in FIG. 8 by lines $I_{L1}$ and $I_{L2}$, respectively. Current through the switches SW1 and SW2 during the switching cycles is represented in FIG. 8 by lines $I_{SW1}$ and $I_{SW2}$, respectively. The input current $I_A$ to the buck converter 28 is depicted graphically by line $I_A$ in FIG. 8, and the output current $I_B$ from the buck converter 28 is depicted graphically by line $I_B$ in FIG. 8. The graphs of the input current $I_A$ and the output current $I_B$ in FIG. 8 show that the current ripple is reduced in the two-phase buck converter 28 compared to the single-phase buck converter 26. Generally, the worst case ripple will be $$I_{(OUTPUT)} \times \frac{1}{(2 \times N)},$$

where N is the number of phases. In the case of the input current $I_A$, the two-phase buck converter 28 generally has an input ripple that is 25% the output current, compared to the single phase buck converter 26 which generally has an input ripple that is 50% the output current. In the case of the output current $I_B$, the two-phase buck converter 28 reduces the output ripple by one half and doubles its frequency compared to the single phase buck converter 28, thereby reducing filtering requirements. However, the inductor currents $I_{L1}$ and $I_{L2}$ do not affect one another as seen from FIG. 8, and ripple on the inductors $L_1$ and $L_2$ and the switches SW1, SW2, SW3 and SW4 is not reduced in the two-phase buck converter 28.

Figure 9:
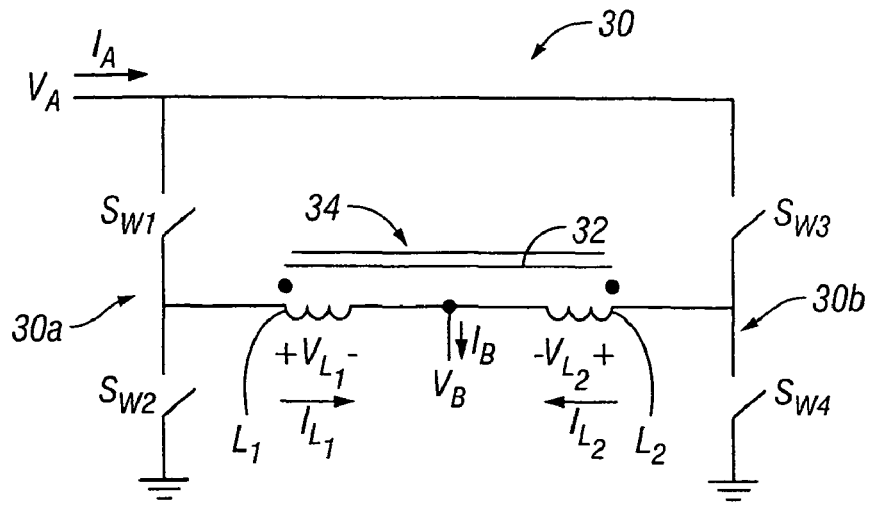
FIG. 9. is an electrical diagram of a coupled inductor multi-phase buck converter employed in the MPPT charge controller of FIGS. 1 and 2.

The MPPT charge controller 10 employs a coupled inductor multi-phase DC to DC buck converter 30 as represented in FIG. 9. The coupled inductor multi-phase buck converter 30 is depicted as a two-phase buck converter composed of two smaller buck converter phase configurations 30a and 30b in parallel. However, the coupled inductor multi-phase buck converter can include more than two buck converter phase configurations. In a preferential but not limiting embodiment, the buck converter 30 is designed for 15 Amps and each smaller buck converter phase configuration 30a and 30b is designed for 7.5 Amps. Each buck converter phase configuration 30a and 30b includes a phase inductor and two phase switches, i.e. inductor $L_1$ and switches SW1 and SW2 for buck converter phase configuration 30a, and inductor $L_2$ and switches SW3 and SW4 for buck converter phase configuration 30b. Switches SW1 and SW3 are controlled switches such as MOSFETS or transistors, and switches SW2 and SW4 can be uncontrolled switches such as diodes. However, to improve efficiency, switches SW2 and SW4 can be controlled switches such as MOSFETS that sometimes operate as an "uncontrolled" diode and sometimes operate as a "controlled" diode. Switches SW1 and SW3 constitute upper or top switches or diodes. Switches SW2 and SW4 constitute lower or bottom switches or diodes as explained further below. The buck converter phase configurations 30a and 30b are similar to the buck converter phase configurations 28a and 28b, but the phase inductors L1 and L2 for buck converter phase configurations 30a and 30b are combined on a single core 32 to form a coupled inductor 34. More specifically, the windings of the phase inductors L1 and L2 are partially or completely wound on the same core 32 to form the coupled inductor 34. The coupling ratio for the phase inductors L1 and L2 of the coupled inductor 34 is controllable within the range of zero (no coupling) and 100% (perfect coupling). A coupling ratio of zero or no coupling in the coupled inductor 34 would essentially make the buck converter 30 functionally equivalent to the buck converter 28 in which the inductors are not wound on the same core and are uncoupled. The coupling ratio for the coupled inductor 34 is selected to be about mid-way between zero coupling and 100% coupling. One of the inductor windings has a magnetizing inductance $L_M$ which represents the loss associated with the magnetizing current. Both inductor windings have a leakage inductance $L_{lk}$ which represents the loss due to imperfect coupling and the energy that is not converted between windings. Additional leakage inductance $L_{lk}$ can be added externally through the use of additional electrical parts or components. The buck converter phase configurations 30a and 30b are staggered or phase shifted, meaning they are run 180° out of phase from one another as described above for the buck converter 28. As in the uncoupled buck converter 28, the coupled inductor buck converter 30 has four states of operation but, because of the coupling of the phase inductors, $I_{L1}$ and $I_{L2}$ are no longer independent variables. In the first state, the buck converter phase configuration 30a is turned on and is connected to the input voltage while the buck converter phase configuration 30b is connected to ground. Energy is transferred through phase configuration 30a and the converter output, and phase configuration 30b transfers energy to the converter output. In the second state, the input is disconnected and both phase configurations 30a and 30b transfer energy to the converter output. The operations are reversed for the third and fourth states. The output current increases in the first state and decreases in the second state, and this cycle repeats again in the third and fourth states. The phase currents also change direction twice per cycle, resulting in a phase ripple current at twice the switching frequency. However, it should be appreciated that less than all of the states of operation may be used in a cycle as previously mentioned hereinabove.

Figure 10:
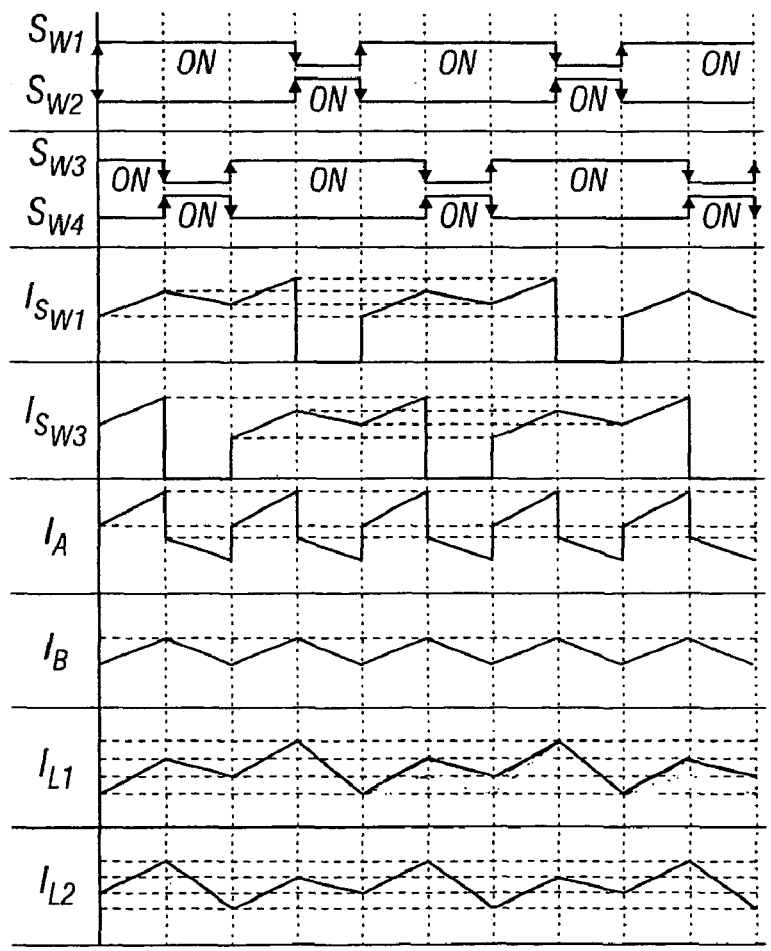
FIG. 10 is a graph depicting input current, output current, and current through phase inductors and switches of buck converter phase configurations of the coupled inductor multi-phase buck converter of FIG. 9 during on-off cycling of the switches of the phase configurations.

Currents through the coupled inductor two-phase buck converter 30 during on-off switching cycles of the switches SW1 and SW3 are graphically depicted in FIG. 10. Switch SW1 is cycled on and off, and switch SW2 operates complementary to switch SW1 in the same manner described for buck converter 28. Switch SW3 is cycled on and off, and switch SW4 operates complementary to switch SW3, except that the on-off switching cycle for switch SW3 is 180° out of phase from the on-off switching cycle for switch SW1 as described above for buck converter 28. Current through the switches SW1 and SW3 is represented in FIG. 10 by lines $I_{SW1}$ and $I_{SW3}$, respectively. When switch SW1 is turned on, current through the switch SW1 is equal to current through inductor $L_1$. Current through switch SW2 would appear the same as line $I_{SW1}$ in FIG. 10. Current $I_{SW3}$ through switch SW3 is the same as the current $I_{SW1}$ through switch SW1 but is shifted ½ cycle from $I_{SW1}$. The input current $I_A$ to the buck converter 30 is depicted graphically by line $I_A$ in FIG. 10. The output current $I_B$ from the buck converter 30 is depicted by line $I_B$ in FIG. 10 and is similar to the output current from the buck converter 28. The input and output currents in FIG. 10 are different from those for buck converter 28 due to the inductor ripple for buck converter 30 being different from the inductor ripple for buck converter 28. The graphs of the input current $I_A$ and the output current $I_B$ in FIG. 10 show that the current ripple is reduced in the buck converter 30 by a factor of two in the same manner as described above for the buck converter 28. Current through the inductors L1 and L2 of the coupled inductor 34 is represented in FIG. 10 by lines $I_{L1}$ and $I_{L2}$, respectively. The graphs of inductor currents $I_{L1}$ and $I_{L2}$ seen in FIG. 10 show that ripple on the phase inductors is reduced and frequency is doubled in the buck converter 30, thusly allowing for smaller and less expensive electrical components and higher performance. The coupled inductor multi-phase buck converter 30 allows for reduced phase ripple for the same output ripple while still maintaining appropriate transient response.

The coupled inductor multi-phase buck converter can be designed as a coupled inductor three-phase buck converter in a manner similar to the buck converter 30, but with three 5 Amp buck converter phase configurations having their phase inductors combined on the same core and the three buck converter phase configurations being equally phase shifted from one another. In a coupled inductor three-phase buck converter, the input ripple is ⅙ the output current, compared to ½ the output current in the single-phase buck converter and ¼ the output current in the two-phase buck converter, and the frequency is tripled.

A further aspect of the MPPT charge controller 10 involves employing a coupled inductor multi-phase buck converter in which one or more buck converter phase configurations is/are intentionally temporarily shut down or turned "off" at low output power. In a preferential but not limiting embodiment, one phase configuration is intentionally shut down when the output current is below a predetermined output current of 2.5 Amps. In power terms, this may be expressed as 30 Watts (2.5 Amps×12 Volts) for a 12 Volt battery system and 60 Watts (2.5 Amps×24 Volts) for a 24 Volt battery system. However, the predetermined output current at which one phase configuration is intentionally shut down can be within the range of zero to maximum capability of one phase configuration. When this occurs, the buck converter phase configuration that remains turned "on" interacts with the circuitry of the "off" buck converter phase configuration, and the upper or lower switch of the disabled or "off" buck converter phase configuration electronically conducts when certain conditions are met. In particular, the lower or bottom diode of the "off" or disabled buck converter phase configuration is turned on and electrically conducts when $$\frac{V_A}{V_B} > 2 + \frac{L_{lk}}{L_m}$$

and the upper or top diode of the "off" or disabled buck converter phase configuration is turned on and electrically conducts when $$1 < \frac{V_A}{V_B} < 1 + \frac{L_m}{L_{lk} + L_m}$$

Figure 19:
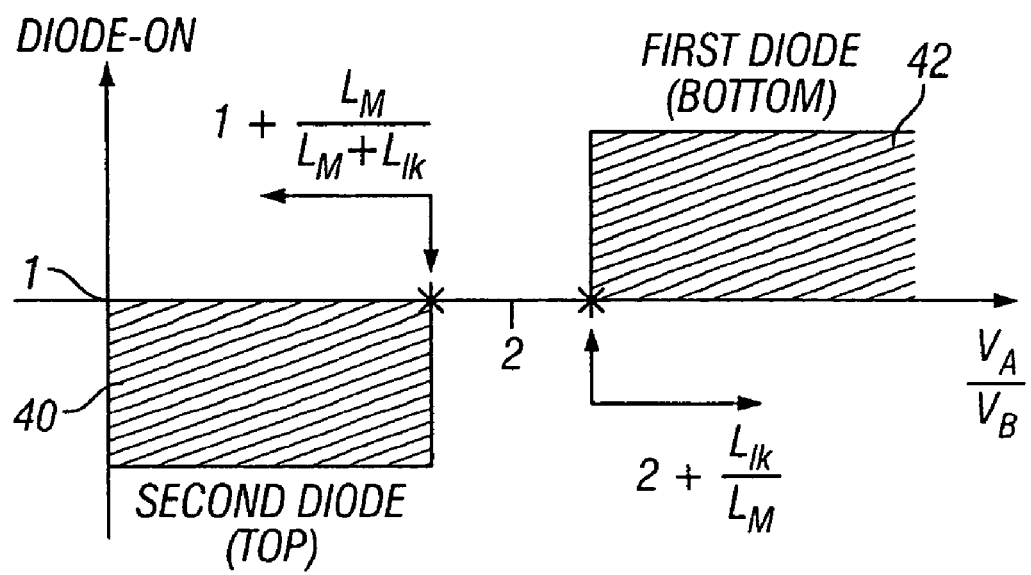

, where $L_{lk}$ equals the equivalent leakage inductance per phase and $L_M$ equals the equivalent magnetizing inductance. FIG. 19 shows the region 40 in which the upper or top diode of the disabled buck converter phase configuration is turned on and the region 42 in which the lower or bottom diode of the disabled buck converter phase configuration is turned on. In the area between these regions 40 and 42, the disabled phase does not interact with the running or on phase.

Figure 11:
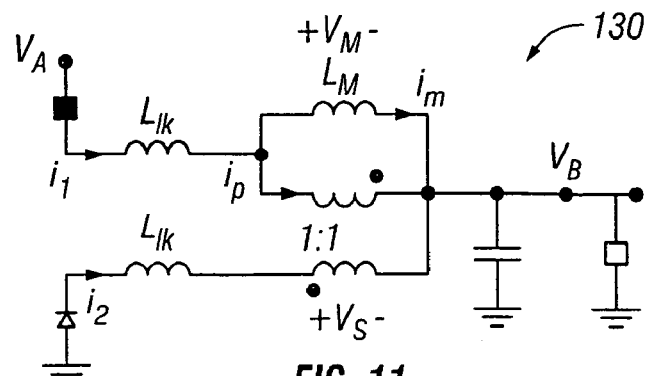
FIG. 11 is an electrical diagram illustrating a first state in a process determining the conditions for turning on a first switch of an intentionally temporarily disabled buck converter phase configuration of the coupled inductor multi-phase buck converter.

FIGS. 11-14 depict electric circuits for a coupled inductor multi-phase buck converter 130 showing the methodology or states of operation involved in turning on a lower diode of a disabled buck converter phase configuration of the buck converter 130. FIGS. 11-14 thusly pertain to region 42 shown in FIG. 19. With reference to FIG. 11, the following conditions apply:

$$V_M = -V_S = L_m \frac{di_m}{dt} = \frac{L_m V_A}{L_{lk} + 2L_m};$$

$$i_p = i_2; i_1 = i_m + i_p;$$

$$L_{lk} \frac{di_2}{dt} = -V_B + \frac{L_m V_A}{L_{lk} + 2L_m};$$

$$L_{lk} \frac{di_1}{dt} = V_A - V_M - V_B = \left[1 - \frac{L_m}{L_{lk} + 2L_m}\right] V_A - V_B.$$

FIG. 11 represents the situation where switch SW1 is turned on, reflected voltage turns on switch SW4, and current $i_2$ increases.

Figure 12:
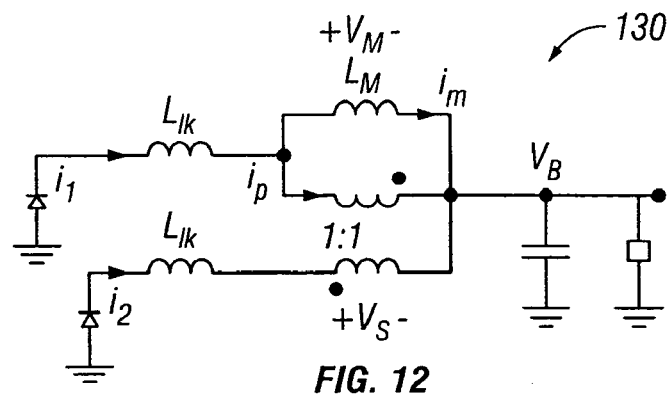
FIG. 12 is an electrical diagram illustrating a second state in the process determining the conditions for turning on the first switch.

With respect to FIG. 12, the following conditions apply:

$$L_{lk} \frac{di_1}{dt} = L_{lk} \frac{di_2}{dt} = -V_B;$$

$$L_m \frac{di_m}{dt} = V_m = O;$$

$$i_1 = i_p + i_m; i_p = i_2.$$

FIG. 12 represents the situation where switch SW1 is turned off, switch SW2 is on, and current $i_2$ decreases.

Figure 13:
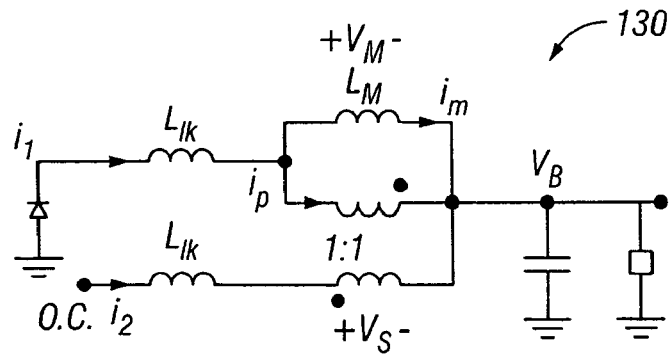
FIG. 13 is an electrical diagram illustrating a third state in the process determining the conditions for turning on the first switch.

With respect to FIG. 13, the following conditions apply:

$$i_p = i_2 = O; i_1 = i_m;$$

$$(L_{lk} + L_m)\frac{di_m}{dt} = -V_B$$

$$V_m = -V_B \frac{L_m}{L_m + L_{lk}}.$$

FIG. 13 represents the situation where switch SW4 turns off if $i_2$, i.e. Phase 2, goes into discontinuous conduction mode (DCM) such that $i_2$=0.

Figure 14:
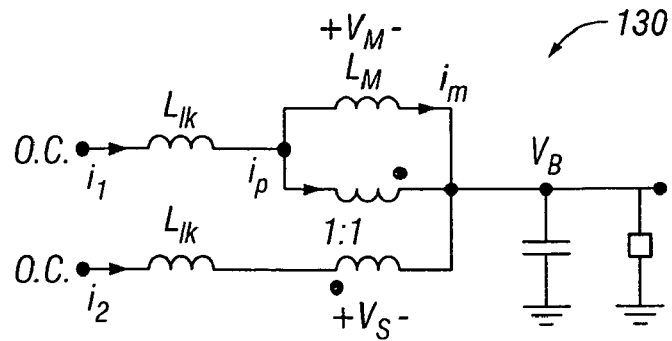
FIG. 14 is an electrical diagram illustrating a fourth state in the process determining the conditions for turning on the first switch.

With reference to FIG. 14, the following conditions apply:

$$i_1 = i_2 = i_p = i_m = O;$$

$$\frac{V_A}{V_B} > 2 + \frac{L_{lk}}{L_m}.$$

FIG. 14 represents the situation where switch SW2 turns off if $i_1$, i.e. Phase 1, enters discontinuous conduction mode (DCM) such that $i_1$=0.

Figure 15:
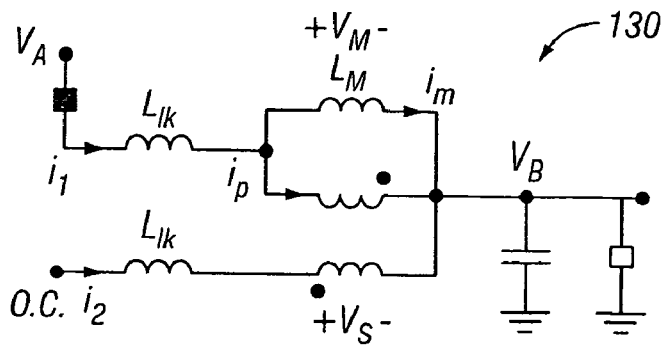
FIG. 15 is an electrical diagram illustrating a first state in a process determining the conditions for turning on a second switch of the intentionally temporarily disabled buck converter phase configuration.

FIGS. 15-18 depict electric circuits for the coupled inductor multi-phase buck converter 130 showing the methodology or states of operation involved in turning on an upper or top diode of the disabled buck converter phase configuration of the converter 130. FIGS. 15-18 thusly pertain to region 40 shown in FIG. 19. With reference to FIG. 15, the following conditions apply:

$$V_m = -V_s; i_2 = i_p = O;$$

$$i_1 = i_m; V_m = L_m \frac{di_m}{dt}$$

-continued $$(L_{lk} + L_m)\frac{di_m}{dt} = V_A - V_n.$$

FIG. 15 represents the situation where switch SW1 is turned on.

Figure 16:
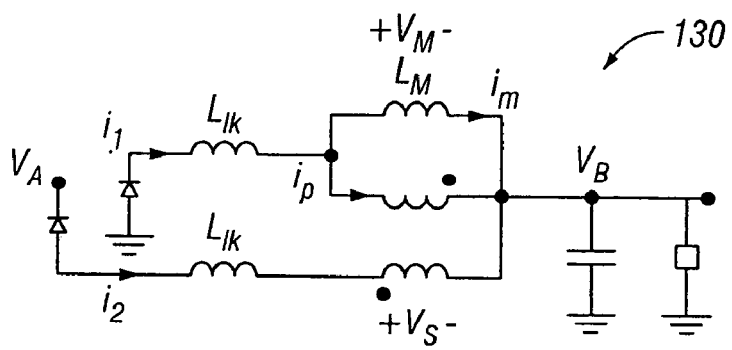
FIG. 16 is an electrical diagram illustrating a second state in the process determining the conditions for turning on the second switch.

With respect to FIG. 16, the following conditions apply $$V_m = -V_S = \frac{-L_m V_A}{L_m + 2L_{lk}}$$

$$i_p = i_2; i_1 = i_m + i_p$$

$$L_{lk}\frac{di_1}{dt} = -V_B - V_m = -V_B + \frac{L_m V_A}{L_m + 2L_{lk}}$$

$$L_{lk}\frac{di_2}{dt} = V_A - V_B - V_S = V_A\left[1 - \frac{L_m}{L_{lk} + 2L_m}\right] - V_B.$$

FIG. 16 represents the situation where switch SW1 is turned off, switch SW2 is turned on, and reflected voltage turns on uncontrolled switch SW3.

Figure 17:
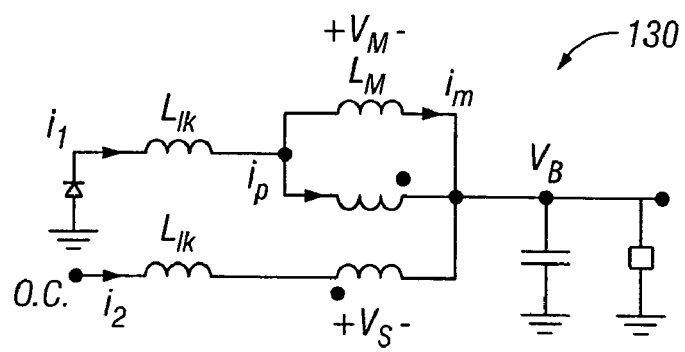
FIG. 17 is an electrical diagram illustrating a third state in the process determining the conditions for turning on the second switch.

With respect to FIG. 17, the following conditions apply $$i_2 = O; i_1 = i_m; V_m = -V_S$$

$$(L_{lk} + L_m)\frac{di_m}{dt} = -V_B$$

$$V_m = L_m\frac{di_m}{dt}.$$

FIG. 17 represents the situation where switch SW3 is turned off if $i_2$/Phase 2 goes into discontinuous conduction mode (DCM) such that $i_2=0$.

Figure 18:
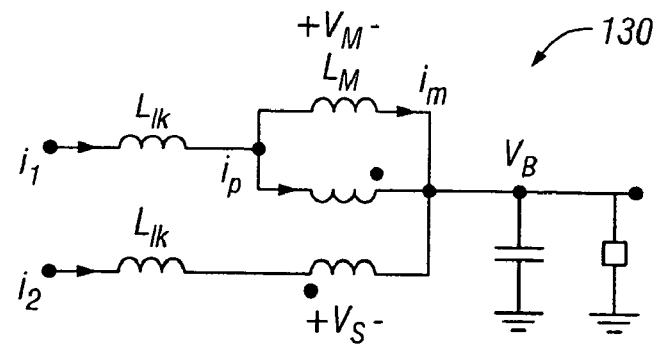
FIG. 18 is an electrical diagram illustrating a fourth state in the process determining the conditions for turning on the second switch.

With respect to FIG. 18, the following conditions apply $$i_1 = i_2 = i_m = O$$

$$V_S = -V_m = O;$$

$$1 < \frac{V_A}{V_B} < 1 + \frac{L_m}{L_{lk} + L_m}.$$

FIG. 18 represents the situation where switch SW2 is turned off if $i_1$/Phase 1 goes into discontinuous conduction mode (DCM).

FIG. 19 graphically shows the region 40 where the upper or top switch or diode of the disabled phase is turned on, the region 42 where the lower or bottom switch or diode of the disabled phase is turned on, and the area between regions 40 and 42 where neither diode is turned on. In the area between regions 40 and 42, the buck converter 130 operates in accordance with FIGS. 15, 17, and 18 as explained above.

The MPPT charge controller with coupled inductor multi-phase buck converter of the present invention operates to "boost" the PV array solar charge current in many instances. For example, 2 Amps of solar current may flow into the MPPT charge controller, with 5 Amps of charge current flowing out to the battery. Since power is the product of voltage and current (Volts×Amps), the following is true (assuming 100% efficiency but small losses in wiring and conversion do occur):

Power into the controller=Power out of the controller;

Volts(in)×Amps(in)=Volts(out)×Amps(out).

If the PV module $V_{mp}$ is greater than the battery voltage $V_s$, it follows that the battery current must be proportionally greater than the solar input current so that input and output power are balanced. The greater the difference between the maximum power voltage and the battery voltage, the greater the current boost. A higher solar input voltage results in a lower solar output current for a given input power. Thus, high voltage solar input strings allow for smaller gauge solar wiring, which is especially advantageous in PV systems with long wiring runs between the PV array and the MPPT charge controller. The MPPT charge controller with coupled inductor multi-phase converter reduces the current ripple on the internal buck converter phase configuration components and increases the current frequency. Smaller, lighter and less expensive electrical components can thusly be used in the MPPT charge controller, allowing the overall size of the controller to be reduced. In a preferential but not limiting embodiment, the MPPT charge controller with coupled inductor multi-phase converter is contained in a housing 44 having an overall length equal or substantially equal to 6.64 inches, an overall width equal or substantially equal to 2.52 inches, and an overall height equal or substantially equal to 2.86 inches. Higher system bandwidth is also achieved in the MPPT charge controller with coupled inductor, providing improved handling of transients. Moreover, higher efficiency is realized by designing the coupled inductor multi-phase buck converter so that one phase of the converter shuts down at low output power. The coupled inductor multi-phase buck converters of the present invention can be run in continuous conduction mode (CCM) or in discontinuous conduction mode (DCM). Furthermore, fewer than all of the states of operation may be run in a cycle.

The MPPT charge controller with coupled inductor multi-phase buck converters of the present invention provides numerous advantages in PV systems including a peak efficiency over 97%, almost no power loss, the ability to charge 12 Volt or 24 Volt batteries with PV arrays of higher nominal voltages, the ability to use up to a 36 Volt PV array to charge either a 24 Volt or 12 Volt battery, the ability to use high voltage and thin film PV modules, maximizing the solar energy harvest from the PV array, increased life of the PV system and increased battery life, increased reliability, increased efficiency and improved performance of the PV system, reduced system cost and reduced cost of converter electrical components, reduced cost by allowing the PV array to be down-sized, by allowing the use of less expensive PV panels and by allowing decreased cable sizes, greater affordability in smaller PV systems up to 400 WP, reduced charge controller dimensions making it easier to install in equipment enclosures, and faster system control bandwidth for handling transients.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A maximum power point tracking charge controller for photovoltaic systems, comprising a maximum power point tracking charge controller for electrical connection to a photovoltaic array including one or more photovoltaic modules and to a battery bank to control charging of the battery bank with electricity produced by the photovoltaic array, said charge controller having a maximum power point tracking algorithm for tracking the maximum power point voltage of the photovoltaic array at which the photovoltaic array produces maximum power, said charge controller having a multi-phase buck converter for receiving voltage input from the photovoltaic array and for supplying voltage output from said buck converter to charge the battery bank, said buck converter converting the voltage input to a voltage output that matches the voltage required by the battery bank for charging, said buck converter storing electrical energy when the voltage input is greater than the voltage required by the battery bank for charging, said buck converter comprising multiple buck converter phase configurations phase shifted from one another, each of said buck converter phase configurations having a phase inductor and first and second switches, said phase inductors being combined on a single core to form a coupled inductor.

2. The maximum power point tracking charge controller recited in claim 1 wherein said buck converter comprises two buck converter phase configurations phase shifted 180° from one another.

3. The maximum power point tracking charge controller recited in claim 2 wherein said buck converter is a 15 Amp buck converter and each of said buck converter phase configurations is a 7.5 Amp buck converter phase configuration.

4. The maximum power point tracking charge controller recited in claim 2 wherein one of said buck converter phase configurations is intentionally temporarily shut down when the current output is below a predetermined current output.

5. A maximum power point tracking charge controller for photovoltaic systems, comprising a maximum power point tracking charge controller for electrical connection to a photovoltaic array including one or more photovoltaic modules and to a battery bank to control charging of the battery bank with electricity produced by the photovoltaic array, said charge controller having a maximum power point tracking algorithm for tracking the maximum power point voltage of the photovoltaic array at which the photovoltaic array produces maximum power, said charge controller having a multi-phase buck converter for receiving voltage input from the photovoltaic array and for supplying voltage output from said buck converter to charge the battery bank, said buck converter converting the voltage input to a voltage output that matches the voltage required by the battery bank for charging, said buck converter storing electrical energy when the voltage input is greater than the voltage required by the battery bank for charging, said buck converter comprising two buck converter phase configurations phase shifted 180° from one another, each of said buck converter phase configurations having a phase inductor and first and second switches, said phase inductors being combined on a single core to form a coupled inductor, one of said buck converter phase configurations being intentionally temporarily shut down when the current output is below a predetermined current output, wherein said buck converter has an equivalent leakage inductance and an equivalent magnetizing inductance, said one of said buck converter phase configurations that is intentionally temporarily shut down includes a first diode and a second diode, said first diode being turned on to conduct electrical current while said one of said buck converter phase configurations is intentionally temporarily shut down and when (voltage input/voltage output)>2+(equivalent leakage inductance/equivalent magnetizing inductance).

6. The maximum power point tracking charge controller recited in claim 5 wherein said second diode is turned on to conduct electrical current while said one of said buck converter phase configurations is intentionally temporarily shut down and when 1<(voltage input/voltage output)<1+(equivalent magnetizing inductance/(equivalent leakage inductance+equivalent magnetizing inductance)).

7. The maximum power point tracking charge controller recited in claim 1 wherein said coupled inductor has a coupling ratio between said phase inductors, said coupling ratio being mid-way between zero coupling and 100% coupling.

8. The maximum power point tracking charge controller recited in claim 1 wherein said charge controller includes a housing having an overall length substantially equal to 6.64 inches, an overall width substantially equal to 2.25 inches, and an overall height substantially equal to 2.86 inches.

9. The maximum power point tracking charge controller recited in claim 1 wherein said charge controller is capable of charging a 12/24 Volt system battery from any one of a 12 Volt, 24 Volt or 36 Volt photovoltaic array.

10. A maximum power point tracking charge controller for photovoltaic systems, comprising a maximum power point tracking charge controller for electrical connection to a photovoltaic array including one or more photovoltaic modules and to a battery bank including one or more batteries to control charging of the battery bank with electricity produced by the photovoltaic array, said charge controller having a maximum power point tracking algorithm for tracking the maximum power point of the photovoltaic array at which the photovoltaic array produces maximum power voltage, said charge controller having a multi-phase buck converter for receiving the maximum power voltage from the photovoltaic array as voltage input to said buck converter and for supplying voltage output from said buck converter to charge the battery bank, said buck converter converting the voltage input to a voltage output that matches the voltage required by the battery bank for charging, said buck converter storing electrical energy when the voltage input is greater than the voltage required by the battery bank for charging, said buck converter comprising multiple buck converter phase configurations phase shifted from one another, each of said buck converter phase configurations having a phase inductor, said phase inductors being combined on a single core to form a coupled inductor, one of said buck converter phase configurations being intentionally temporarily shut down when the power output is below a predetermined power output.

11. The maximum power point tracking charge controller recited in claim 10 wherein said one of said buck converter phase configurations is intentionally temporarily shut down when the power output is below 30 Watts for a 12 Volt system battery and below 60 Watts for a 24 Volt system battery.

12. A maximum power point tracking charge controller for photovoltaic systems, comprising a maximum power point tracking charge controller for electrical connection to a photovoltaic array including one or more photovoltaic modules and to a battery bank including one or more batteries to control charging of the battery bank with electricity produced by the photovoltaic array, said charge controller having a maximum power point tracking algorithm for tracking the maximum power point of the photovoltaic array at which the photovoltaic array produces maximum power voltage, said charge controller having a multi-phase buck converter for receiving the maximum power voltage from the photovoltaic array as voltage input to said buck converter and for supplying voltage output from said buck converter to charge the battery bank, said buck converter converting the voltage input to a voltage output that matches the voltage required by the battery bank for charging, said buck converter storing electrical energy when the voltage input is greater than the voltage required by the battery bank for charging, said buck converter comprising multiple buck converter phase configurations phase shifted from one another, each of said buck converter phase configurations having a phase inductor, said phase inductors being combined on a single core to form a coupled inductor, one of said buck converter phase configurations being intentionally temporarily shut down when the power output is below a predetermined power output, wherein said one of said buck converter phase configurations is intentionally temporarily shut down when the power output is below 30 Watts for a 12 Volt system battery and below 60 Watts for a 24 Volt system battery, wherein said buck converter has an equivalent leakage inductance and an equivalent magnetizing inductance, said one of said buck converter phase configurations that is intentionally temporarily shut down includes a first diode and a second diode, said first diode being turned on to conduct electrical current while said one of buck converter phase configurations is intentionally temporarily shut down and when (voltage input/voltage output)>2+(equivalent leakage inductance/equivalent magnetizing inductance).

13. The maximum power point tracking charge controller recited in claim 12 wherein said second diode is turned on to conduct electrical current while said one of said buck converter phase configurations is intentionally temporarily shut down and when one 1<(voltage input/voltage output)<1+(equivalent magnetizing inductance/(equivalent leakage inductance+equivalent magnetizing inductance)).

14. The maximum power point tracking charge controller recited in claim 13 wherein said buck converter comprises two buck converter phase configurations phase shifted 180° from each other.

15. The maximum power point tracking charge controller recited in claim 14 wherein said buck converter is a 15 Amp buck converter and each of said buck converter phase configurations is a 7.5 Amp buck converter phase configuration.

16. A method of controlling battery charging in a photovoltaic system having a charge controller electrically connected to a photovoltaic array and to a battery bank, said method comprising the steps of
operating a maximum power point tracking algorithm of the charge controller to track the maximum power point voltage of the photovoltaic array at which the photovoltaic array produces maximum power;
supplying the maximum power voltage as voltage input to a buck converter of the charge controller that includes multiple buck converter phase configurations having phase inductors combined on a single core to form a coupled inductor;
operating the buck converter to convert the voltage input into voltage output that matches the voltage required by the battery bank for charging, said step of operating the buck converter including running the multiple buck converter phase configurations out of phase from one another when the voltage output is above a predetermined voltage output and intentionally temporarily shutting down one of the buck converter phase configurations when the voltage output is below the predetermined voltage output; and
supplying the voltage output from the charge controller to the battery bank to charge one or more batteries of the battery bank.

17. The method of controlling battery charging recited in claim 16 wherein said step of intentionally temporarily shutting down one of the buck converter phase configurations includes intentionally temporarily shutting down the buck converter phase configuration when the power output is below 30 Watts for a 12 Volt system battery and below 60 Watts for a 24 Volt system battery.

18. The method of controlling battery charging recited in claim 16 wherein said step of shutting down includes conducting electrical current across a first diode or across a second diode of the buck converter phase configuration that has been shut down depending on the value of voltage input/voltage output.

19. A method of controlling battery charging in a photovoltaic system having a charge controller electrically connected to a photovoltaic array and to a battery bank, said method comprising the steps of
operating a maximum power point tracking algorithm of the charge controller to track the maximum power point voltage of the photovoltaic array at which the photovoltaic array produces maximum power;
supplying the maximum power voltage as voltage input to a buck converter of the charge controller that includes multiple buck converter phase configurations having phase inductors combined on a single core to form a coupled inductor;
operating the buck converter to convert the voltage input into voltage output that matches the voltage required by the battery bank for charging, said step of operating the buck converter including running the multiple buck converter phase configurations out of phase from one another when the voltage output is above a predetermined voltage output and intentionally temporarily shutting down one of the buck converter phase configurations when the voltage output is below the predetermined voltage output, wherein said step of shutting down includes conducting electrical current across a first diode or across a second diode of the buck converter phase configuration that has been shut down depending on the value of voltage input/voltage output, wherein the buck converter has an equivalent leakage inductance and an equivalent magnetizing inductance, and said step of conducting includes conducting electrical current across the first diode when (voltage input/voltage output)>2+(equivalent leakage inductance/equivalent magnetizing inductance); and
supplying the voltage output from the charge controller to the battery bank to charge one or more batteries of the battery bank.

20. The method of controlling battery charging recited in claim 19 wherein said step of conducting includes conducting electrical current across the second diode and not the first diode when 1<(voltage input/voltage output)<1+(equivalent magnetizing inductance/(equivalent leakage inductance+equivalent magnetizing inductance)).

* * * * *